United States Patent [19]

Li

[11] Patent Number: 5,484,032
[45] Date of Patent: Jan. 16, 1996

[54] HANGER DEVICE TO BE USED IN A BICYCLE BRAKE ASSEMBLY

[75] Inventor: Jung-Hua Li, Chang-Hua, Taiwan

[73] Assignee: Ah-Pin Lin, Chang-Hua, Taiwan

[21] Appl. No.: 441,798

[22] Filed: May 16, 1995

[51] Int. Cl.⁶ .................................. B62L 1/00; B62L 1/12
[52] U.S. Cl. .................... 188/24.21; 74/502.4; 74/502.6; 188/2 D; 188/24.12
[58] Field of Search ................. 188/2 D, 24.21, 188/24.22, 24.19, 24.18, 24.17, 24.16, 24.15, 24.14, 24.13, 24.12, 204 R; 74/502.6, 502.4

[56] References Cited

U.S. PATENT DOCUMENTS

| 2,160,181 | 5/1939 | Taylor | 188/24.19 |
|---|---|---|---|
| 3,878,920 | 4/1975 | Fugii | 188/24.21 |
| 4,256,205 | 3/1981 | Hamar | 188/24.21 |
| 4,290,506 | 9/1981 | Nagano et al. | 188/24.19 |
| 4,480,720 | 11/1984 | Shimano | 188/24.15 |
| 4,869,351 | 9/1989 | Romano | 74/502.6 |
| 4,896,750 | 1/1990 | Tseng | 188/24.19 |
| 5,228,542 | 7/1993 | Mack | 188/24.12 |
| 5,425,434 | 6/1995 | Romano | 188/24.15 |

FOREIGN PATENT DOCUMENTS

| 0428058 | 8/1911 | France | 188/24.21 |
|---|---|---|---|
| 0548714 | 1/1923 | France | 188/24.21 |
| 11919 | 5/1897 | United Kingdom | 188/24.11 |
| 0017034 | 9/1897 | United Kingdom | 188/24.11 |
| 0021378 | 8/1905 | United Kingdom | 188/24.11 |
| 2041120 | 9/1980 | United Kingdom | 188/2 D |

*Primary Examiner*—Douglas C. Butler
*Attorney, Agent, or Firm*—Baker & Botts

[57] ABSTRACT

A hanger device is used to interconnect a pull cable and a yoke cable in a bicycle brake assembly and includes a vertical guide rod which is adapted to be mounted to a fork portion of a bicycle frame. A slidable member is mounted slidably on the guide rod and is adapted to be connected to the pull cable. The slidable member is formed with a transverse receiving groove that is adapted to receive an intermediate portion of the yoke cable therein.

7 Claims, 5 Drawing Sheets

5,484,032

HANGER DEVICE TO BE USED IN A BICYCLE BRAKE ASSEMBLY

BACKGROUND OF THE INVENTION

1. Field Of The Invention

This invention relates to a hanger device for a bicycle brake assembly, more particularly to a hanger device for interconnecting a pull cable and a yoke cable in a bicycle brake assembly.

2. Description Of The Related Art

Referring to FIG. 1, a conventional hanger device 10 is shown to be incorporated in a bicycle brake assembly which includes a pull cable 15 that connects the conventional hanger device 10 to a brake operating lever (not shown). A pair of brake arms 11 are connected pivotally to a fork portion 22 of a bicycle frame 20. A yoke cable 13 connects the brake arms 11 to the conventional hanger device 10 such that, when the brake operating lever is activated, the conventional hanger device 10 moves upward to cause the brake arms 11 to pivot toward each other and enable the brake shoes 12 thereon to abut against the rim 21 of a wheel (partly shown) that is mounted rotatably on the fork portion 22 of the bicycle frame 20.

The following disadvantages arise when the conventional hanger device 10 is in use:

1. Since movement of the conventional hanger device 10 relative to the fork portion 22 of the bicycle frame 20 is unrestricted, lateral movement of the conventional hanger device 10 may occur when the conventional hanger device 10 moves upward, thereby reducing the braking effect.

2. Each of the brake arms 11 is incorporated with a return spring (not shown) for returning the brake arm 11 to its initial position when the brake operating lever is released. When the returning forces of the return springs of the brake arms 11 are different, the brake forces applied on the rim 21 of the wheel by the brake arms 11 are uneven, thereby resulting in a one-sided braking action that may lead to unbalance and uneven wearing of the brake shoes 12.

3. When the pull cable 15 snaps, the conventional hanger device 10 and/or the brake arms 11 fall down and may be interposed between the spokes (not shown) of the wheel, thereby locking the wheel of the bicycle suddenly. This may cause the bicycle to overturn.

SUMMARY OF THE INVENTION

Therefore, the main object of the present invention is to provide a hanger device for interconnecting a pull cable and a yoke cable in a bicycle brake assembly, which hanger device is capable of overcoming the aforementioned drawbacks that are commonly associated with the prior art.

According to the present invention, a hanger device is used for interconnecting a pull cable and a yoke cable in a bicycle brake assembly, and includes a vertical guide rod which is adapted to be mounted to a fork portion of a bicycle frame. A slidable member is mounted slidably on the guide rod and is adapted to be connected to the pull cable. The slidable member is formed with a transverse receiving groove that is adapted to receive an intermediate portion of the yoke cable therein.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
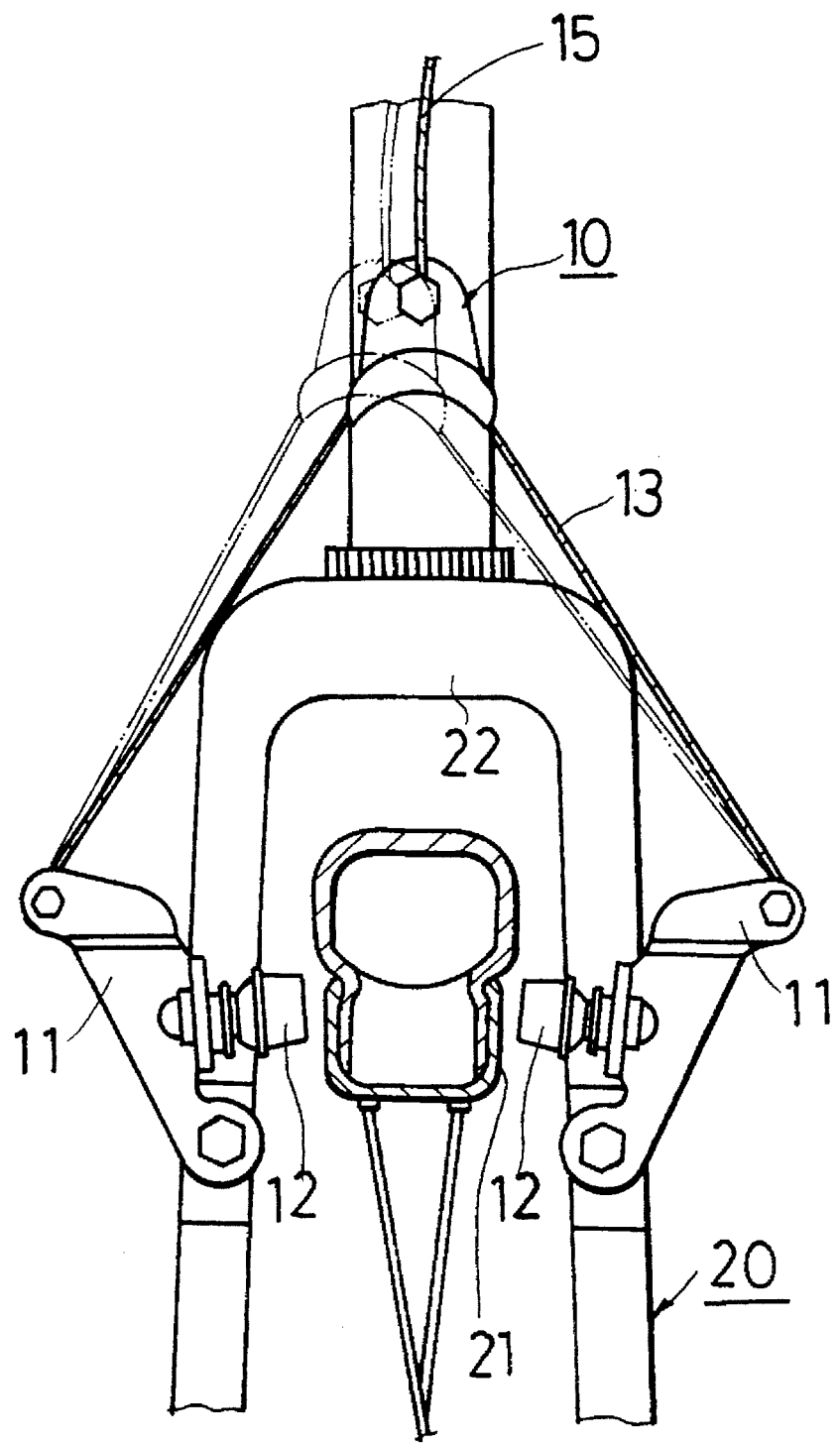
FIG. 1 is a schematic view illustrating a conventional hanger device used in interconnecting a pull cable and a yoke cable in a bicycle brake assembly.
Figure 2:
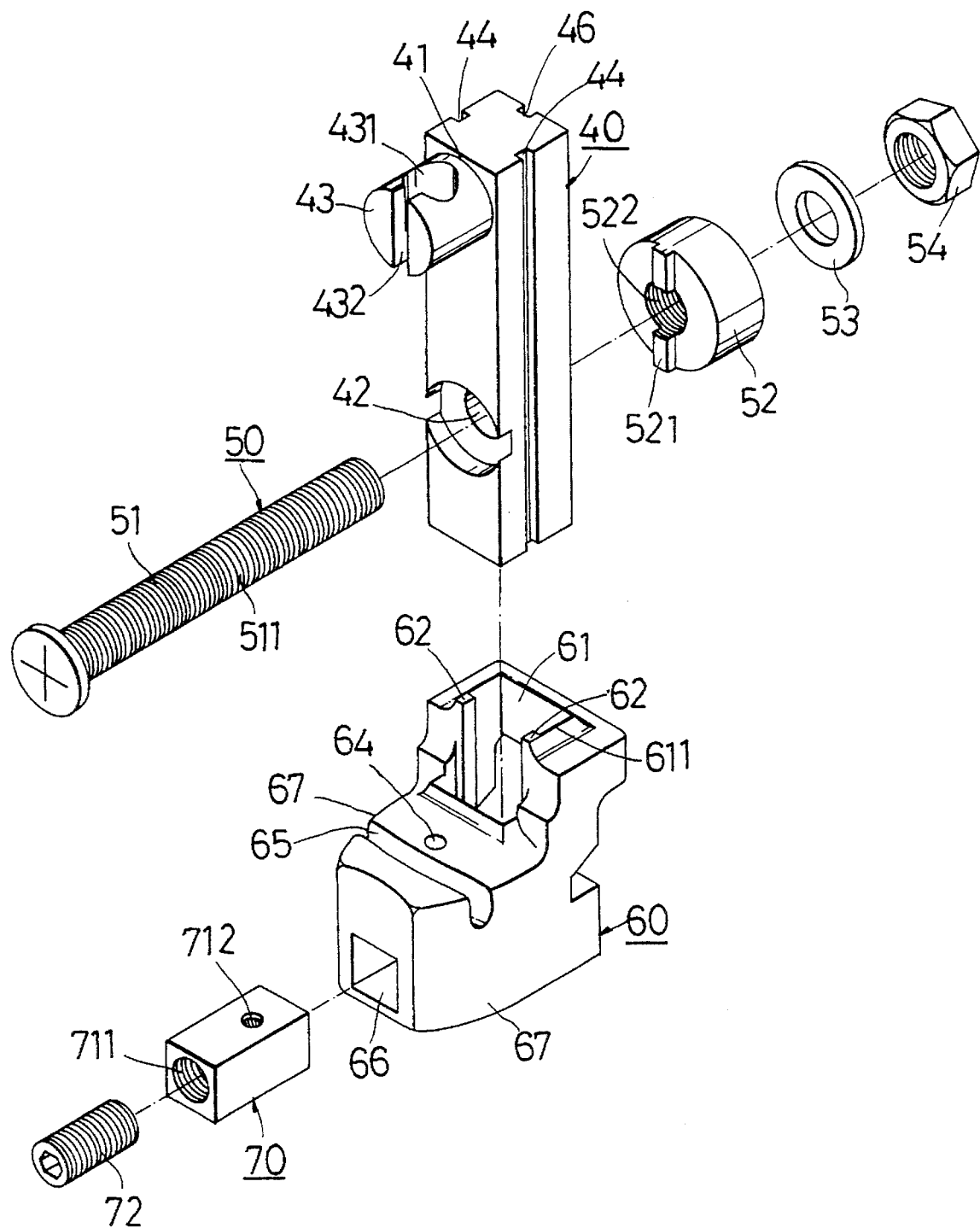
FIG. 2 is an exploded view showing a hanger device according to the present invention.
Figure 3:
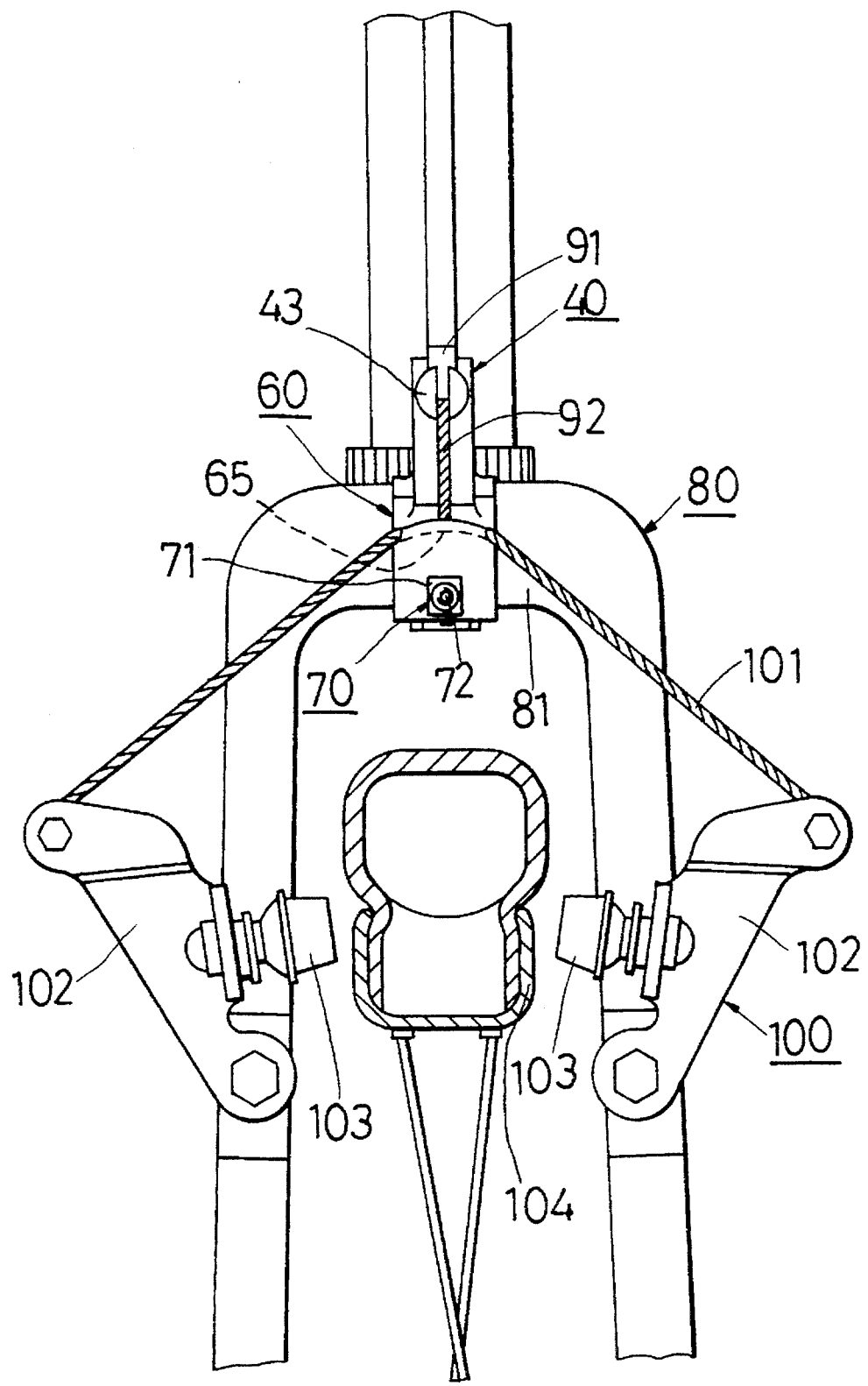
FIG. 3 is a schematic view illustrating the hanger device shown in FIG. 2, the hanger device being incorporated in a bicycle brake assembly to interconnect a pull cable and a yoke cable of the latter.

Referring to FIGS. 2 and 3, a hanger device according to the present invention includes a vertical guide rod 40, a fastening unit 50, a slidable member 60 and an insert member 70.

The vertical guide rod 40 has two opposite side walls. Each of the side walls of the guide rod 40 is formed with a vertically extending keyway 44. The guide rod 40 further has a front wall and a rear wall which is opposite to the front wall and which is formed with a vertically extending keyway 46. The guide rod 40 is formed with a through-hole 42 that extends through the front and rear walls at a lower end portion of the guide rod 40 and has a projection 43 that extends frontwardly from an upper end portion of the guide rod 40. The projection 43 is formed with a vertically extending through-hole 431 and has a distal end formed with a vertically extending slit 432 that is communicated with the through-hole 431.

The fastening unit 50 includes a locking bolt 51 with a shank portion 511. A cylindrical stop member 52 is formed with an axial hole 522 and has a flat end surface that is formed with a pair of diametrically opposite keys 521 which engage the keyway 46 in the rear wall of the guide rod 40. The shank portion 511 of the locking bolt 51 extends through the through-hole 42 of the guide rod 40, the axial hole 522 of the stop member 52, a fork portion 81 of a bicycle frame 80 and a washer 53, and engages threadably a nut 54 so as to mount the guide rod 40 to the fork portion 81 of the bicycle frame 80. It is noted that the stop member 52 spaces the guide rod 40 from the fork portion 81 of the bicycle frame 80.

In the present embodiment, the slidable member 60 is a generally L-shaped hollow member and has a vertical section and a horizontal section extending from a lower portion of the vertical section. The vertical section is formed with a through-hole 61 through which the guide rod 40 extends such that the slidable member 60 is slidable relative to the guide rod 40. The vertical section of the slidable member 60 has two opposite inner side walls. Each of the inner side walls of the slidable member 60 is formed with a key 62 which extends slidably into the keyway 44 in a corresponding one of the side walls of the guide rod 40. The vertical section of the slidable member 60 has a top surface formed with a scraping edge 611 around the through-hole 61.

The horizontal section of the slidable member 60 has two opposite side walls 67 and a top surface formed with a receiving groove 65 which extends from one of the side walls 67 of the horizontal section of the slidable member 60 to the other one of the side walls 67 of the horizontal section of the slidable member 60. The receiving groove 65 has an intermediate portion, two end portions, and a depth increasing gradually from the intermediate portion to the end portions. The horizontal section of the slidable member 60 is further formed with a longitudinal passage 66 which has a polygonal cross-section. The top surface of the horizontal section of the slidable member 60 is further formed with a cable hole 64 adjacent to the receiving groove 65 to access the longitudinal passage 66.

The insert member 70 is inserted fittingly into the longitudinal passage 66 and is formed with a longitudinal screw hole 711 into which a screw rod 72 extends threadably. The insert member 70 is further formed with an insert hole 712 that is aligned with the cable hole 64 of the slidable member 60.

During assembly, the guide rod 40 extends through the through-hole 61 of the slidable member 60. The keys 62 of the slidable member 60 engage respectively the keyways 44 of the guide rod 40 such that the slidable member 60 is movable only along the guide rod 40. The insert member 70 is inserted into the longitudinal passage 66 of the slidable member 60. Then, the guide rod 40 is mounted to the fork portion 81 of the bicycle frame 80 by the fastening unit 50 in the manner described beforehand. It is noted that the engagement between the keys 521 of the stop member 52 and the keyway 46 of the guide rod 40 prevent relative movement between the stop member 52 and the guide rod 40. The pull cable 92 has a sheathed portion 91 which extends into the through-hole 431 of the projection 43 and an exposed end portion which extends into the screw hole 711 of the insert member 70 via the cable hole 64 in the slidable member 60 and the insert hole 712 in the insert member 70 and which is retained in the screw hole 711 by the screw rod 72 to connect the pull cable 92 to the slidable member 60. The yoke cable 101 of a bicycle brake assembly has two end portions connected respectively to the brake arms 102 and an intermediate portion received in the receiving groove 65 of the slidable member 60 such that the brake arms 102 move toward each other to permit the brake shoes 103 thereon to abut a rim 104 of a wheel (partly shown) of the bicycle when the slidable member 60 moves upward.

Figure 4:
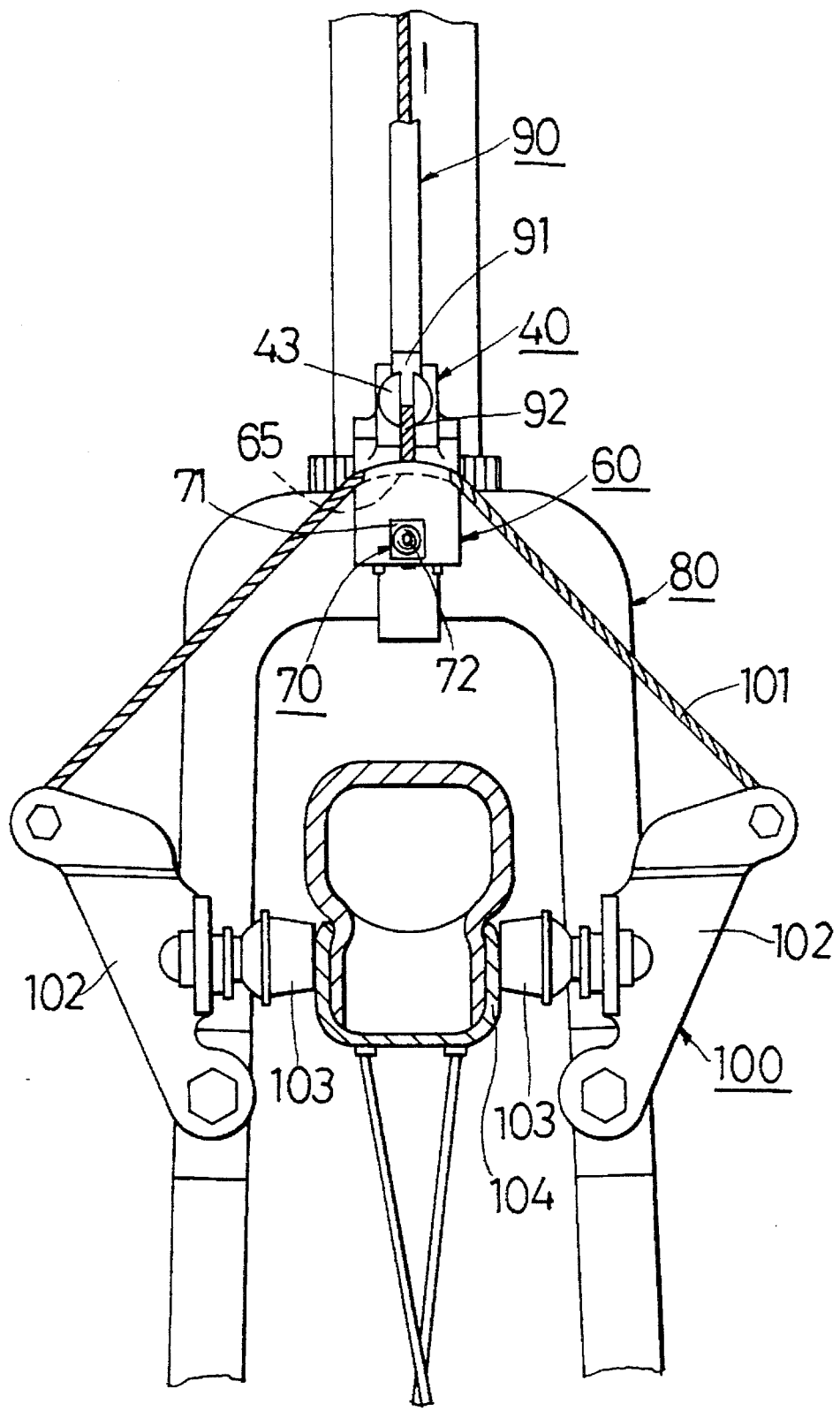
FIG. 4 is a schematic view similar to that of FIG. 3, the bicycle brake assembly being in a braking state.

Referring now to FIG. 4, in operation, when a brake operating lever (not shown) which is connected to the pull cable 92 is actuated, the pull cable 92 moves upward so as to cause upward movement of the slidable member 60, thereby moving the yoke cable 101 upwardly and thus resulting in pivoting movement of the brake arms 102 toward each other. The brake shoes 103 on the brake arms 102 abut the rim 104 of the bicycle wheel so as to stop rotation of the latter. When the brake operating lever is released, the slidable member 60 moves downward due to the return force applied on each brake arm 102 by the respective return spring (not shown).

Figure 5:
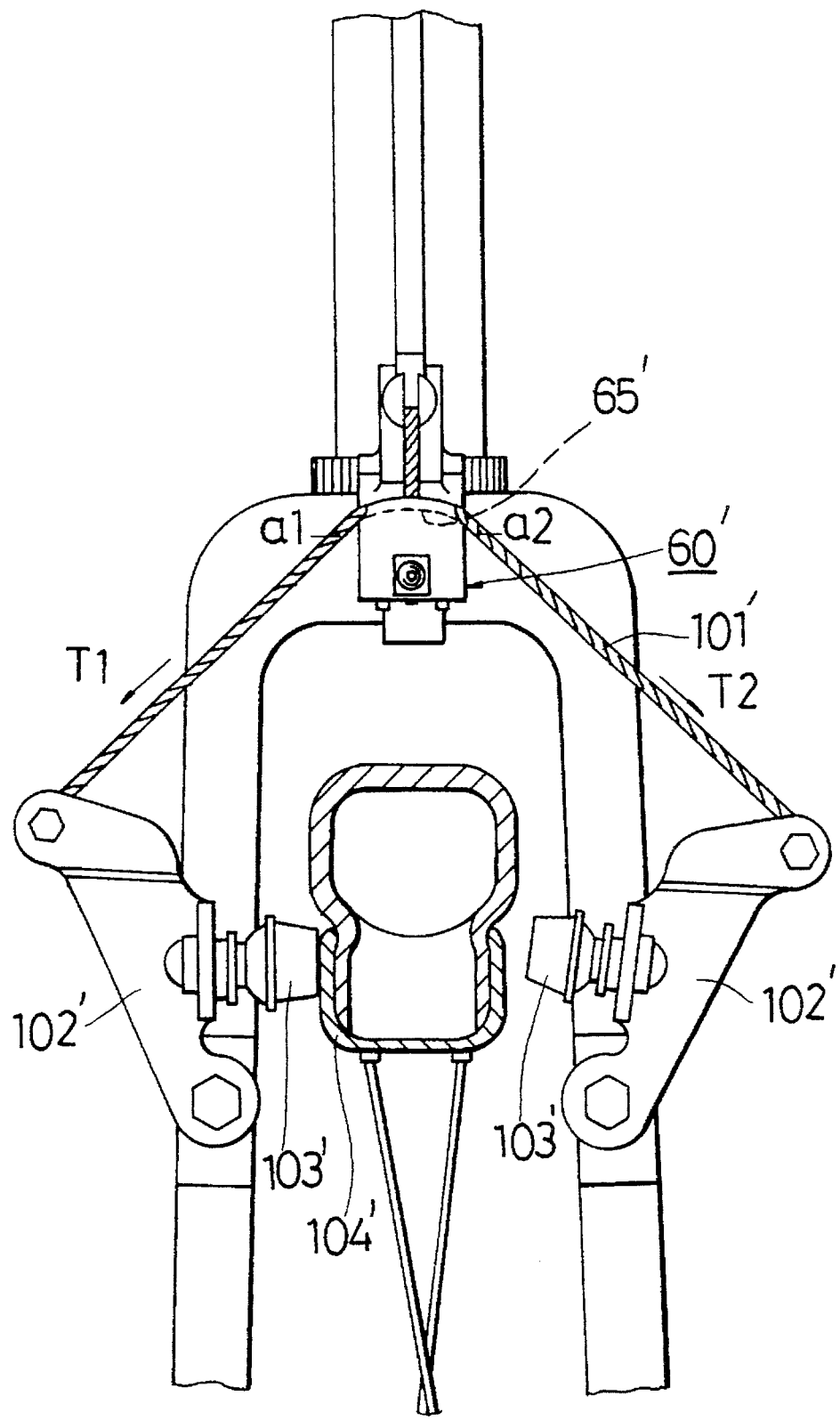
FIG. 5 is a schematic view similar to that of FIG. 3, illustrating how the hanger device of this invention prevents occurrence of a one-sided braking action even though the returning forces of the return springs of the brake arms of the bicycle brake assembly are different.

Referring now to FIG. 5, in the event that a new pair of brake arms 102' is installed and if the return forces of the return springs (not shown) of the brake arms 102' are different, the tensional forces (T1,T2) applied on the two ends of the yoke cable 101' by the brake arms 102' are different such that, when the brake arms 102' move toward each other for the first time, the brake shoe 103' on one of the brake arms 102' abuts against the rim 104' of the bicycle wheel while the brake shoe 103' on the other one of the brake arms 102' does not abut against the rim 104', thereby resulting in a one-sided braking action. In order to remedy further occurrence of the one-sided braking action, supposing that there are two points (a1,a2) on the yoke cable 101' at the same level relative to the slidable member 60', when the brake operating lever is released, the pull cable 92' and the slidable member 60' move downward due to the return force applied on each brake arm 102' by the respective return spring. At this time, since the depth of the receiving groove 65' in the slidable member 60' increases gradually from the intermediate portion to the end portions, the point (a1) moves to a lower level while the point (a2) moves to a higher level relative to the slidable member 60' so as to balance the tensional forces (T1,T2). Thus, the brake shoes 103' of the brake arms 102' are able to abut against the rim 104' of the bicycle wheel at the same time during the next braking action.

Accordingly, the hanger device of the present invention has the following advantages:

1. The slidable member 60,60' is mounted slidably on the guide rod 40 which is secured to the bicycle frame 80 such that lateral movement of the slidable member 60,60' relative to the fork portion of the bicycle frame is prevented when the slidable member 60,60' moves upward.

2. Gradually increasing the depth of the receiving groove 65,65' permits automatic recovery of the bicycle brake assembly from a one-sided braking action.

3. Since the slidable member 60,60' is provided with a scraping edge 611 around the through-hole 61 of the slidable member 60,60', the accumulation of dust on the side walls of the guide rod 40 is prevented, thereby permitting normal operation of the bicycle brake assembly.

4. Since the guide rod 40 is connected to the fork portion of the bicycle, no component will fall down between the spokes of the bicycle wheel when the pull cable 92,92' snaps so as to prevent locking of the wheel, thereby avoiding accidental overturning of the bicycle.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A hanger device for interconnecting a pull cable and a yoke cable in a bicycle brake assembly, said hanger device comprising:

a vertical guide rod adapted to be mounted to a fork portion of a bicycle frame; and a slidable member mounted slidably on said guide rod and adapted to be connected to the pull cable, said slidable member being formed with a transverse receiving groove that is adapted to receive an intermediate portion of the yoke cable therein.

2. A hanger device as claimed in claim 1, further comprising a fastening unit which includes a locking bolt that extends through said guide rod to mount said guide rod to the fork portion of the bicycle frame.

3. A hanger device as claimed in claim 1, wherein said guide rod has two opposite side walls, at least one of said side walls of said guide rod being formed with a vertically extending keyway, said slidable member being a generally L-shaped member and having a vertical section formed with a through-hole through which said guide rod extends such that said slidable member is slidable relative to said guide rod, said vertical section of said slidable member having two opposite inner side walls, at least one of said inner side walls of said slidable member being formed with a key which extends slidably into said keyway of a corresponding one of said side walls of said guide rod.

4. A hanger device as claimed in claim 3, wherein said slidable member further has a horizontal section extending from a lower portion of said vertical section, said horizontal section of said slidable member having two opposite side walls and a top surface formed with said receiving groove which extends from one of said side walls of said horizontal section of said slidable member to the other one of said side walls of said horizontal section of said slidable member, said receiving groove having an intermediate portion, two end portions, and a depth increasing gradually from said intermediate portion of said receiving groove to said end portions of said receiving groove.

5. A hanger device as claimed in claim 4, wherein said horizontal section of said slidable member is further formed with a longitudinal passage, said top surface of said horizontal section of said slidable member being further formed with a cable hole in communication with said longitudinal passage, said hanger device further comprising an insert member which is inserted fittingly into said longitudinal passage and which is formed with a longitudinal screw hole, said insert member being formed with an insert hole that is aligned with said cable hole of said slidable member, and a screw rod extending threadably into said screw hole of said insert member, whereby, a distal end of the pull cable is insertable into said screw hole of said insert member via said cable hole in said slidable member and said insert hole in said insert member and is retained in said screw hole by said screw rod to connect the pull cable to said slidable member.

6. A hanger device as claimed in claim 5, wherein said longitudinal passage has a polygonal cross-section.

7. A hanger device as claimed in claim 3, wherein said vertical section of said slidable member has a top surface formed with a scraping edge around said through-hole.

* * * * *